(No Model.) 6 Sheets—Sheet 4.

G. B. & J. T. SNOW.
CORN HARVESTER.

No. 385,286. Patented June 26, 1888.

Fig 5.

Witnesses,
W. C. Corlies.
A. M. Best.

Inventors,
Gilbert B Snow,
James T Snow,
By Coburn & Thacher,
Attorneys (No Model.)

G. B. & J. T. SNOW.
CORN HARVESTER.

Patented June 26, 1888.

Fig. 15.

Witnesses.
B. M. Whitaker.
Irone Miller.

Inventor.
Gilbert B. Snow.
James T. Snow.
By Coburn & Thacher,
Attys.

UNITED STATES PATENT OFFICE.

GILBERT B. SNOW AND JAMES T. SNOW, OF SUGAR GROVE, ILLINOIS.

CORN-HARVESTER.

SPECIFICATION forming part of Letters Patent No. 385,286, dated June 26, 1888.

Application filed April 15, 1887. Serial No. 234,973. (No model.)

*To all whom it may concern:*

Be it known that we, GILBERT B. SNOW and JAMES T. SNOW, citizens of the United States, and residing at Sugar Grove, in the county of Kane and State of Illinois, have invented a certain new and useful Improvement in Corn-Harvesters, which is fully set forth in the following specification, reference being had to the accompanying drawings, in which—
Fig. 6, a detail plan view showing the front portion of the framing and a portion of the mechanism mounted thereon; Fig. 7, a detail view of one of the carrying-chains and its support or guide;
Fig. 8, a detail sectional view of the same, taken on the line 2 2 of Fig. 7;
Fig. 9, a detail plan view of one of the links of the carrying-chains detached;
Fig. 10, a side elevation of the same;
Fig. 11, an end elevation of the same;
Fig. 12, a detail plan section, taken on the line 3 3 of Fig. 4;
Fig. 13, a detail view of the clutch mechanism shown in Fig. 12;
Fig. 14, a detail perspective view of one of the discharge-arms of the binding mechanism.

Like letters refer to like parts in all the figures of the drawings.

Our invention relates to corn-harvesters, and has for its object to produce a machine adapted to operate upon the standing corn to cut the standing stalks, form the same into bundles of suitable size, bind these bundles and discharge them from the machine each onto the ground, or into a wagon or other suitable receptacle.

We will now proceed to describe a machine embodying our invention in one form, and will then particularly point out in the claims those features which we deem to be new and desire to protect by Letters Patent.

Figure 5:
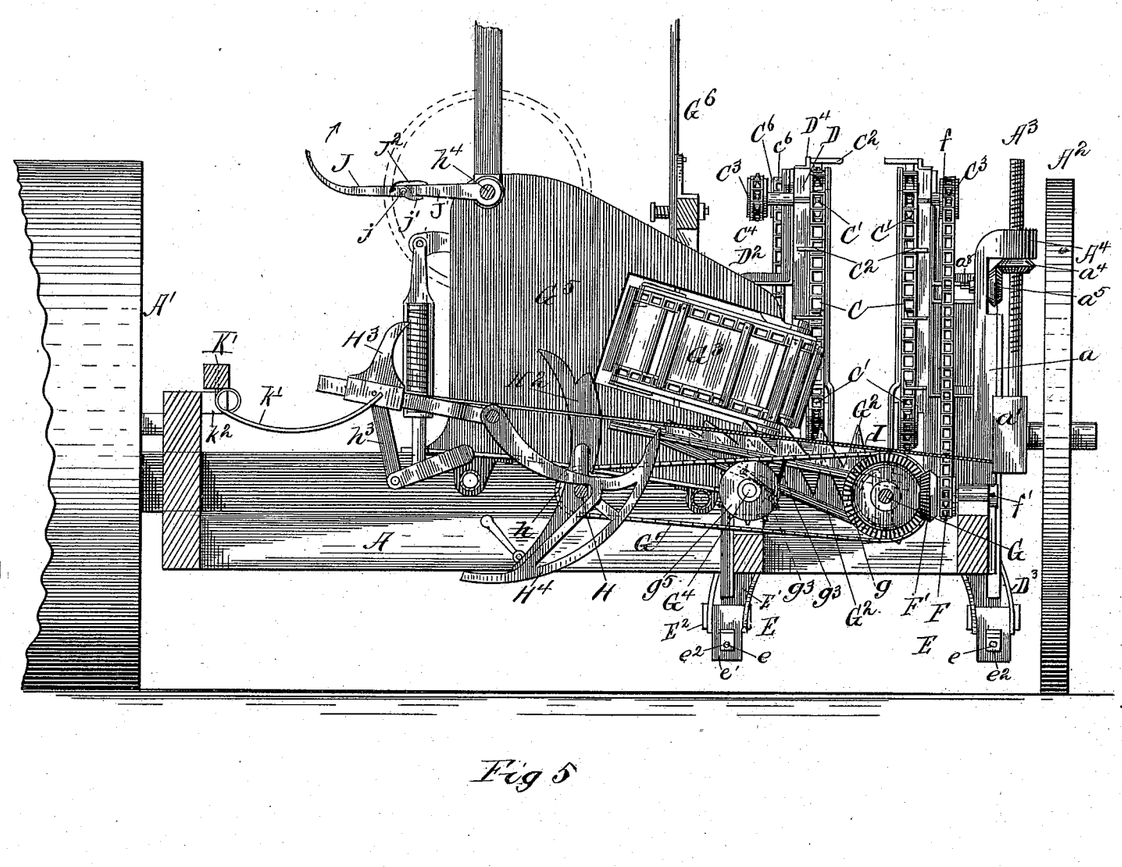
Fig. 5, a sectional view taken on the line 1 1 of Fig. 2.

In the drawings, A represents the main frame which is constructed in a manner suitable to properly support the various mechanisms which it is designed to carry. This frame has the draft-rigging attached to it at any suitable point and is supported upon two wheels, one of which, A′, constitutes the bull-wheel or driving-wheel from which the power which operates the machine is derived, while the other one, A², forms a support for the opposite side of the machine, and may be termed the "grain-wheel." The connection between the frame A and the wheel A² is preferably adjustable, so that that side of the frame which is supported by the said wheel A² may be raised or lowered to bring the cutter and its associated mechanism into the desired position with relation to the ground. The adjustment at this point is preferably effected in the following manner. A vertical way, $a$, extends upward from the side of the frame A, and receives a bearing-block, $a'$, which carries the wheel A² in the manner shown in Figs. 2 and 5 of the drawings, the said block being capable of vertical movement upon the way $a$, and having slots $a^2$ for the passage of clamping-bolts $a^3$, which serve to secure the said block after adjustment. In order to provide more effective means for adjusting the block $a'$ upon the way $a$, we provide the said block with an upwardly-extending screw, A³, which passes through an internally-threaded bevel gear-wheel, $a^4$, which may be rotated by means of a corresponding bevel gear-wheel $a^5$, the shaft of which is provided with a suitable wrench-grasp, $a^6$, as shown in Fig. 5 of the drawings, or with any other suitable means for rotating the same. A bracket, A⁴, at the upper end of the way $a$ serves to support the upper end of the screw A³ and the bevel gear-wheel $a^4$. By means of this construction the side of the frame supported by the wheel A² may be readily raised or lowered, as desired. The wheel A′ is provided with a gear-wheel, A⁵, which meshes with a pinion, $a^6$, on a shaft, A⁶, the said pinion being loose on the shaft, but capable of being connected with the same by means of a clutch, A⁷, in order to rotate the said shaft. The shaft A⁶ is connected by suitable gearing, in the manner hereinafter described, to the various mechanisms which compose the machine, so that the entire machine may be thrown into or out of operation through the medium of the clutch A⁷.

Figures 6, 7, 8, 9, 10, 11, 12, 13, 14:
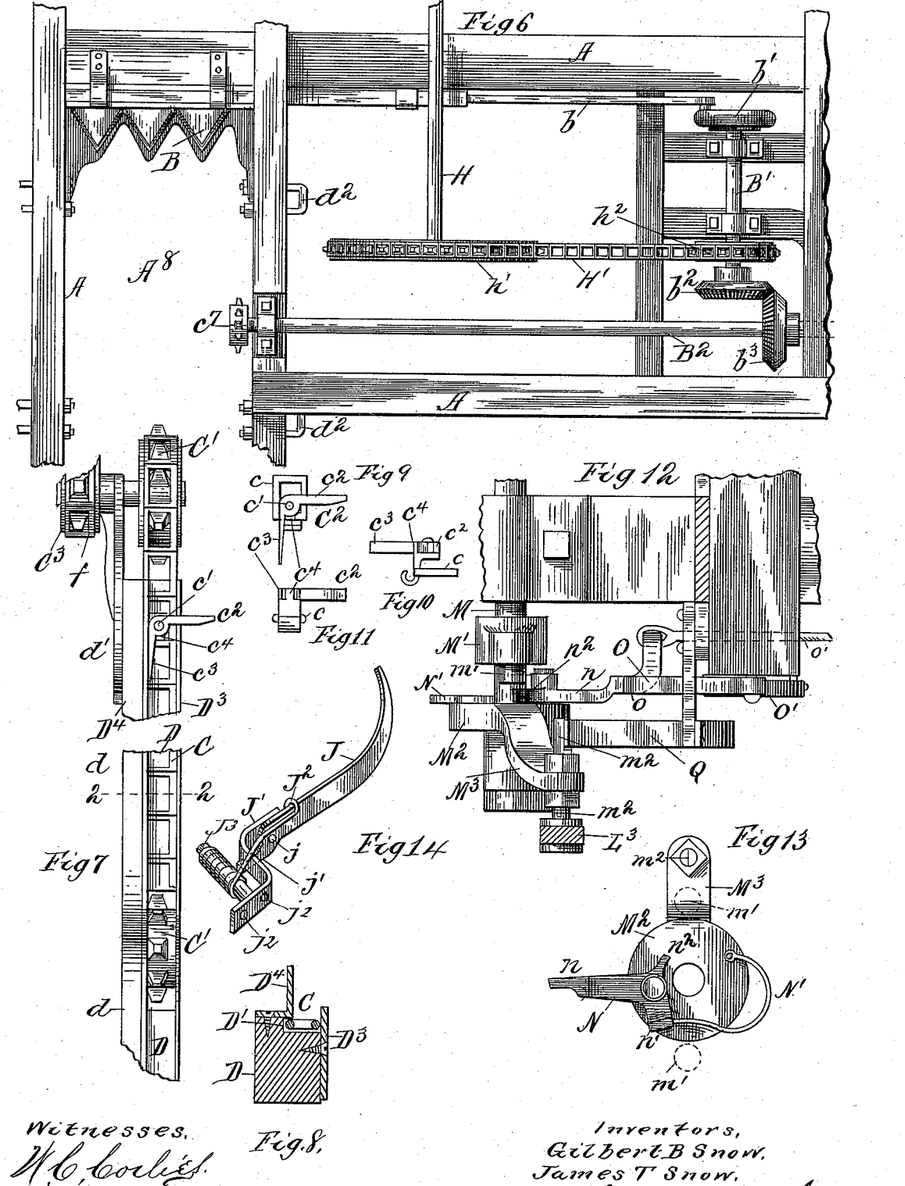
Figure 15:
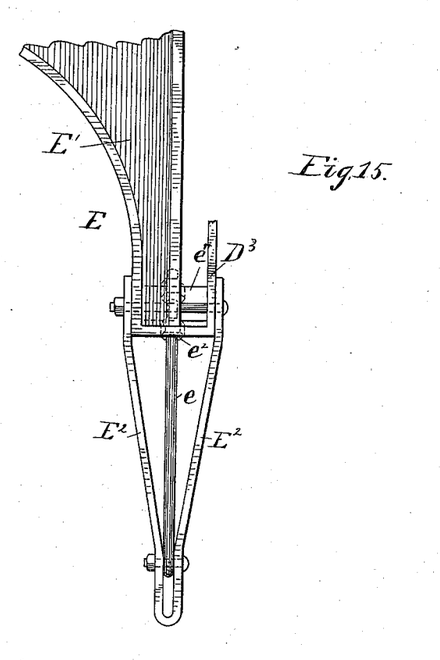
Fig. 15, a detail plan view of one of the gathering-arms and its gathering-finger.

The frame A is open at the front at that side thereof adjacent to the grain-wheel $A^2$, as shown more particularly in Fig. 6 of the drawings, and at the rear of this open space $A^8$ is arranged a suitable cutter, B, of any approved construction, the form shown being a reciprocating cutter actuated by means of a pitman, $b$, connected to a crank-wheel, $b'$, on the rear of a shaft, B'. The shaft B' is provided at its front end with a bevel gear-wheel, $b^2$, which meshes with a similar bevel gear-wheel, $b^3$, on a transverse shaft, $B^2$, near the front of the frame A. The shaft $B^2$ is provided near its left-hand end with a sprocket-wheel, $b^4$, over which and over a sprocket-wheel, $B^3$, on the shaft $A^6$ passes a drive-chain, $B^4$, by means of which power is communicated to the shaft $B^2$ and thence through the mechanism described to the cutter B. On each side of the space $A^8$ is arranged a carrying-chain, C. The construction and arrangement of these two chains being identical, we will only describe that of one of them, it being, of course, understood that the same description is equally applicable to the other.

D represents a support and guide for the chain, having a forward downwardly-inclined portion, $d$, and a rear horizontal portion, $d'$. This support is shaped in cross-section, as shown in detail in Fig. 8, being provided at its inner upper corner with a rabbet, D', which forms a guide for the chain C. The guide-support D is mounted upon suitable uprights, $D^2$, which are adjustably connected to the frame A at their lower ends, this connection being preferably effected by means of eyebolts $d^2$, through which the said uprights pass, and which serve to clamp the same against the frame A, so that the guide-support and the carrying-chain mounted thereon may be adjusted vertically to any desired height. Upon the inner side of the guide support D is secured a metallic strap, $D^3$, which forms in conjunction with the rabbet D' a guiding-groove for the chain C, the said strap preventing lateral displacement of the chain, which runs in the groove thus formed, in the manner shown in detail in Figs. 7 and 8. On the upper side of the guide-support D is arranged a bearing-plate, $D^4$, which extends along the same from front to rear, and serves to hold the carrying-dogs in operative position in the manner hereinafter described.

Figure 1:
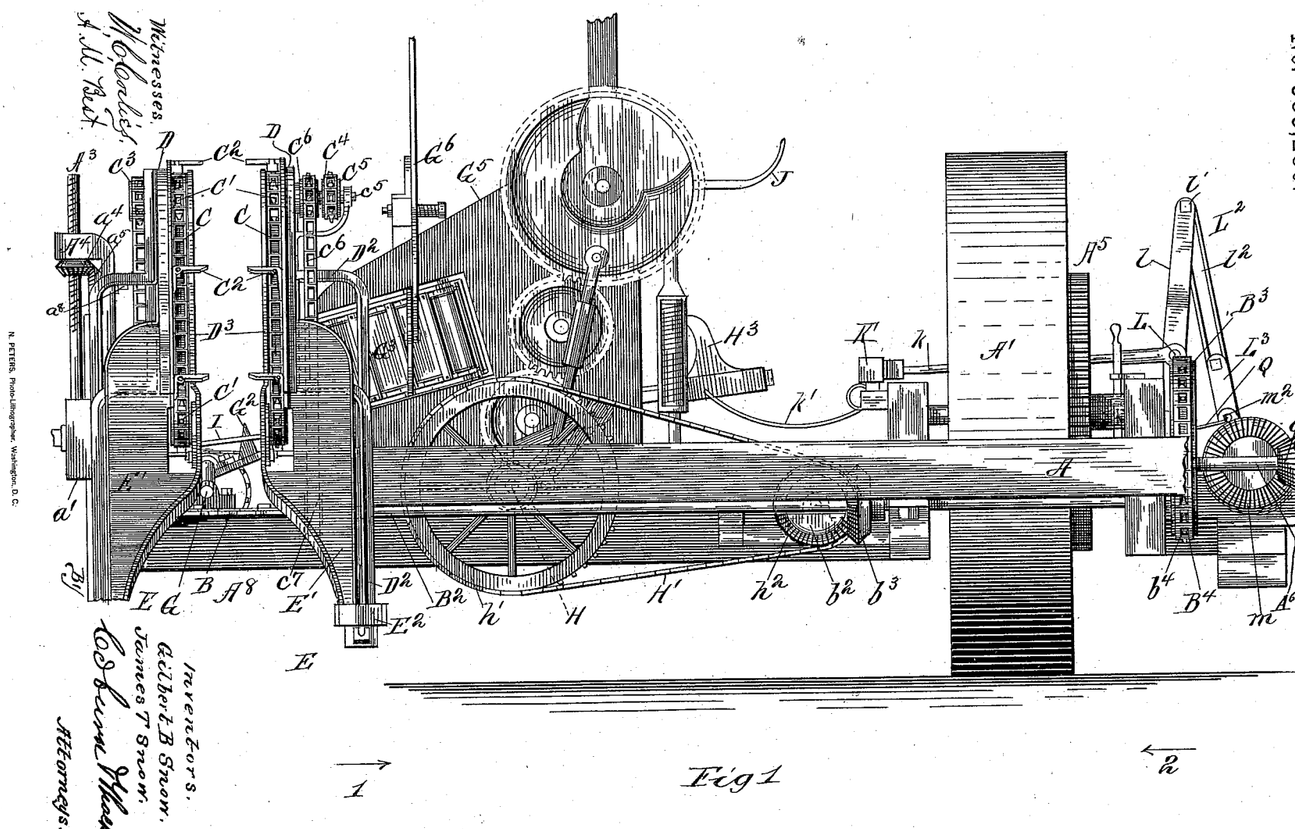
Figure 1 is a front elevation of a machine embodying our invention.
Figure 2:
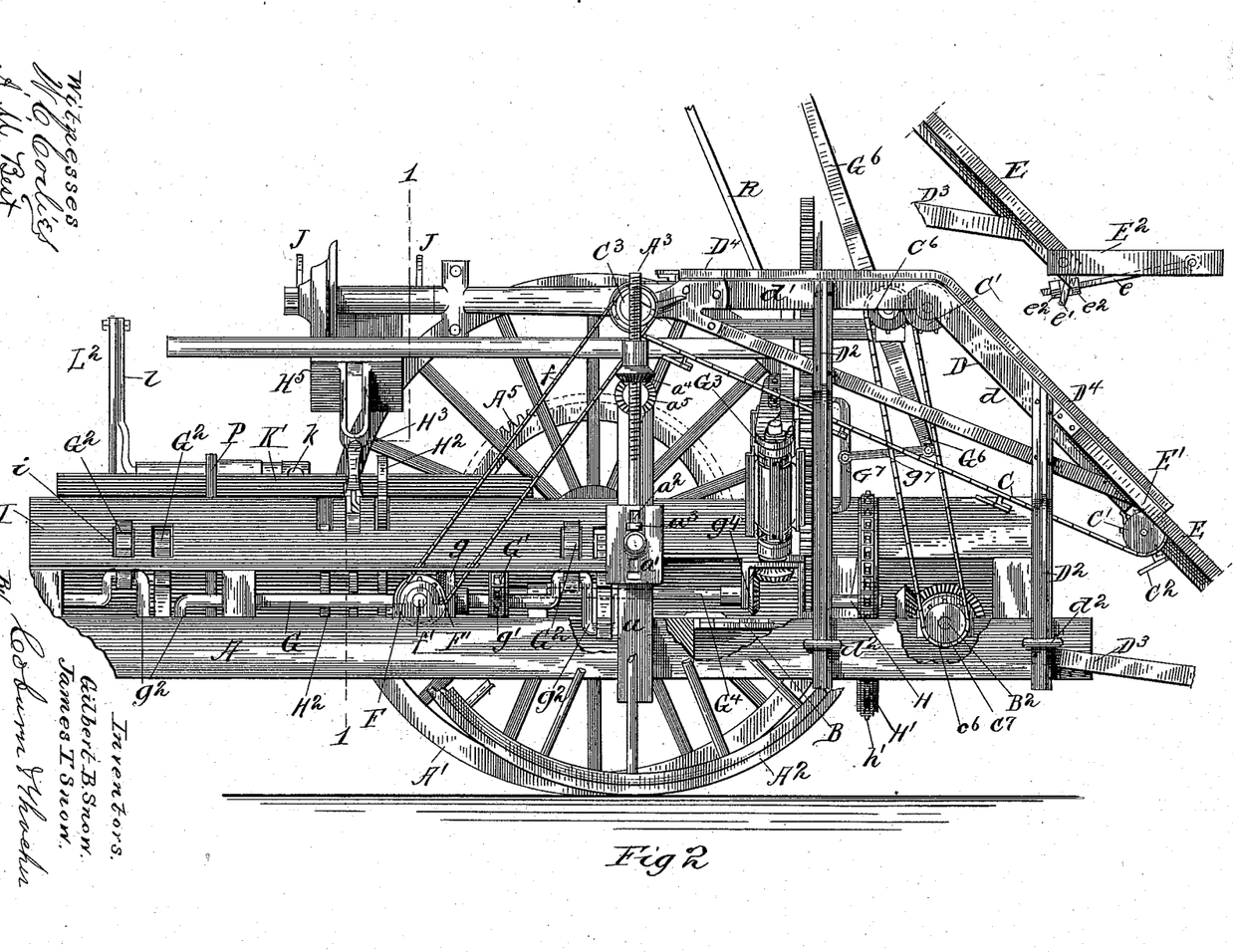
Fig. 2, a side elevation of the same, viewed in the direction of the arrow 1 in Fig. 1.
Figures 3, 4:
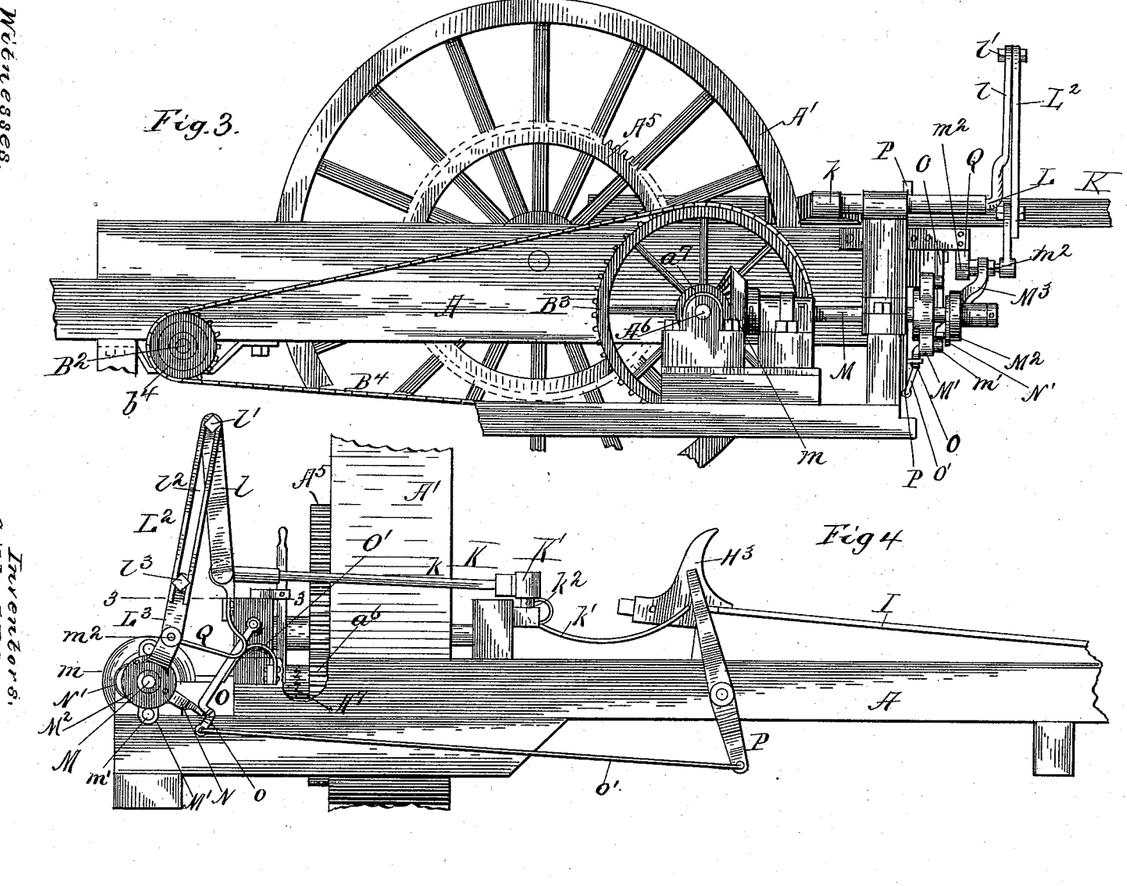
Fig. 3, a detail side elevation of the machine, viewed in the direction of the arrow 2 in Fig. 1.
Fig. 4, a detail rear elevation.

From the front of each guide-support D gathering-arms E extend downward and forward, as shown in Figs. 1 and 2. Each of these arms is formed by means of a board, E', which is supported by a downward extension of the strap $D^3$, which downward extension of said strap is continued to the lower end of the board, and is then carried rearward and secured to the lower end of the upright $D^2$, as shown in Fig. 2. It will thus be seen that the reference-letter E designates the entire arm, the two principal parts of which it is composed being the board E' and the strap $D^3$.

At the lower end of each gathering-arm E is pivoted a gathering-finger, $E^2$, which is adjustable nearer to or farther from the ground by means of a screw-bolt, $e$, pivoted near its forward end and extending rearward through a suitable lug, $e'$, on the lower end of the gathering-arm E, said bolt being provided with nuts $e^2$ on each side of said lug to secure it after adjustment.

Each carrying-chain C passes over sprocket-wheels C', by means of which it is supported and driven. These chains may be of any approved construction, and are provided at suitable intervals with links $c$, upon which the carrier-dogs $C^2$ are mounted. Each dog is mounted upon a pivot, $c'$, extending upward from the link $c$, and consists of two arms or fingers, one of which, $c^2$, serves to carry the corn rearward, while the other, $c^3$, bears against the bearing-plate $D^4$ in the manner shown in Fig. 7, and serves to hold the arm $c^2$ in operative position during the rearward travel of the said dog. A stop, $c^4$, is also provided on the link $c$ to limit the movement of the dog $C^2$. It will thus be seen that while the dog is being carried rearward along the guide-support D the arm $c^2$ thereof will be firmly held by the bearing-plate $D^4$, against which the arm $c^3$ bears, in such position that the said arm $c^2$ will project outward, so as to engage with the corn which enters the space between the two chains and carry the same rearward to the cutter. During the forward travel of the dog, however, it is free to swing upon its pivot, so that its arms will not engage with the corn, thereby causing the carrying-chain to operate only in one direction.

Power is supplied to actuate the carrying-chains by means of sprocket-wheels $C^3$ on the shafts of the rear sprocket-wheels, C', over which said chains travel. In the construction shown the left-hand chain is driven by means of a sprocket-chain, $C^4$, which passes over the sprocket-wheel $C^3$ and over sprocket-wheel $C^5$ on a short shaft, $c^5$, mounted on the guide-support D, as shown. Another sprocket-wheel, $C^6$, on this shaft has passing over it a sprocket-chain, $c^6$, which runs over a sprocket-pinion, $C^7$, on the end of the shaft $B^2$, from which the power is transmitted to the left-hand carrying-chain C through the mechanism just described. The right-hand carrying-chain C is driven by means of a sprocket-chain, $f$, passing over its sprocket-wheel $C^3$ and over a similar sprocket-wheel, F, on a short shaft, $f'$, mounted on the frame A, and provided with a bevel-pinion, F', which meshes with a bevel gear-wheel, $g$, on a longitudinal shaft, G. A sprocket-wheel, $g'$, is mounted on the shaft G, over which a sprocket-chain, G', passes to a sprocket-wheel, $h$, on a second longitudinal shaft, H, which forms the packer-shaft of the binding mechanism and which is driven by means of a sprocket-wheel, $h'$, on its front end, over which and over a sprocket-wheel, $h^2$, on the shaft B' a sprocket-chain, H', passes. By this means power is transmitted to the right-hand carrying-chain C in order to actuate the same.

I represents a deck arranged to the rear and at one side of the cutter B and carrying-chains C, so that the stalks, after being cut by the cutter, are laid by the carrying-chains upon the said deck. Suitable conveyers are provided for carrying the stalks laterally across this deck to the binding mechanism, and these conveyers are preferably constructed in the following manner: The shaft G is provided with two or more double cranks, $g^2$, upon which are pivoted one end of the toothed conveyers $G^2$, their other ends being supported by pivoted links $g^3$, so that the teeth of the said conveyers project upward through suitable slots $i$ in the deck I while moving toward the binding mechanism and sink below said deck while moving away from it. The conveyers are arranged in pairs which act alternately with each other, and thus serve to convey the stalks laterally across the said deck to the binding mechanism. $G^3$ indicates a butter of any approved construction driven by a bevel-pinion, $g^4$, on the front end of a shaft, $G^4$, the latter having a sprocket-wheel, $g^5$, over which the chain $G'$ passes. The butter is arranged in a suitable aperture in a transverse vertical shield, $G^5$, and is adjusted by a lever, $G^6$, in the usual manner, through the medium of a link, $g^7$, by means of which said lever is connected to the yoke $G^7$ of the butter. It serves to even the butts of the severed stalks and aids in feeding the same to the binding mechanism.

The binding mechanism may be of any approved type, that which we have shown being that known as the "Applebly binder," and does not require a detailed description here, as it is not of our invention. It is provided with the usual packers, $H^2$, driven by the shaft H, the usual compressor $H^3$ connected to the binder-trip mechanism to operate the same by means of a link, $h^3$, the needle-arm $H^4$, and the knotter mechanism $H^5$, actuated by the cam-shaft $h^3$, connected to the shaft H by the usual gearing. The only feature in which it differs from the ordinary binding mechanism is in the construction of the discharge-arms J, which are pivoted to their supports $J'$, as shown by pivots $j$, being provided with a stop, $j'$, extending under the said support, so that the said discharge-arms J may yield upward in the direction of their movement after discharging the bundle, for the purposes hereinafter stated. In Fig. 5 these supports are shown as connected directly to the shaft $h^4$, while in Fig. 14 the device is shown in a modified form, the support $J'$ being shorter and being adapted to be secured to an arm on the shaft $h^4$. Springs $J^2$ serve to hold the arms J normally in proper position.

In Fig. 14 the support $J'$ is shown provided with rivet-holes $j^2$, by means of which it may be connected to a suitable arm attached to the shaft $h^4$. In this construction the support $J'$ is provided with a short stub shaft or mandrel, $J^3$, around which the spring $J^2$ is coiled, as shown in Fig. 14.

From the binder the bundle, after having been formed, bound, and tied in the usual manner, passes to the bundle-discharger K, which is arranged at one side of the said binder. This bundle-discharger comprises a longitudinal bar, $K'$, connected by means of an arm, $k$, to a rock-shaft, L, actuated in the manner hereinafter described. The bar $K'$ is provided with a series of spring-arms, $k'$, which serve to receive the bundle as it comes from the binder. The motion of the rock-shaft L, imparted in the manner hereinafter described, causes the bundle-discharger K to move upward in the arc of a circle at the proper time, thereby carrying the bundle over the main wheel $A'$ and throwing it clear of the machine at that side. The rock-shaft L is arranged on the outer side of the said wheel $A'$, and the bundle-discharger K is of sufficient length to carry the bundle over and clear of the said wheel. Spring-buffers $k^2$, of rubber or other suitable material, are arranged upon the main frame A in such a position that as the bundle-discharger descends in returning to its first position the bar $K'$ will strike upon these spring-buffers, and thus reduce the shock to a minimum. The rock-shaft L is operated by means of the following mechanism. An arm, $l$, extends upward from the rock-shaft and is provided at its upper end with a pin, $l'$.

$L^2$ represents a link having a slot, $l^2$, and connected to the arm $l$ by means of the pin $l'$, which enters the said slot $l^2$. The link $L^2$ is provided with a lower extension, $L^3$, adjustable in relation to the upper portion or link proper and connected thereto by a clamping-bolt, $l^3$, passing through the slot $l^2$ in the upper portion or link proper. By this means a link of adjustable length is formed.

M represents a shaft provided at its forward end with a bevel gear-wheel, $m$, which meshes with a corresponding pinion, $a^7$, on the end of the shaft $A^6$.

$M'$ represents a collar fixed upon the said shaft and provided with rearward-projecting pins $m'$.

$M^2$ represents a disk mounted loosely on the shaft M and provided with a crank-arm, $M^3$, having a crank-pin, $m^2$, to which the link $L^2$ is connected, the connection being shown as effected in the present instance by pivoting the lower end of the extension $L^3$ of said link on said crank-pin.

N represents a pawl pivoted on the front face of the disk $M^2$ and provided with arms $n$ and $n'$.

$N'$ represents a spring arranged to throw the arm $n'$ of the pawl N outward, so as to cause it to project beyond the periphery of the disk $M^2$, and $n^2$ represents a stop to limit this motion of the pawl by bearing against the shaft M.

O represents a stop-arm pivoted to the frame A and provided with a shoulder, $o$, arranged in the path of the arm $n$ of the pawl N to act as a stop for the same.

$O'$ represents a suitable spring arranged to hold the stop-arm O normally in the path of the said arm $n$.

The stop-arm O is connected by means of a rod, o', to a trip-arm, P, pivoted on the rear of the frame A, and having its upper end arranged in the path of the bundle and in such relation to the other parts of the machine that as the bundle passes from the binder to the bundle-discharger it will strike against said trip-arm and actuate the same.

It will be seen that when the trip-arm P is actuated by the bundle in passing on to the bundle-discharger K the said trip-arm will, through the medium of the rod o', withdraw the stop-arm O and release the arm n of the pawl N. The spring N' will then throw the arm n' of the said pawl outward into the path of the pins m', and these latter will, by reason of their engagement with the said arm n', cause the disk $M^2$ to revolve, and, through the medium of the link $L^2$, draw the arm l of the rock-shaft L downward, thus giving a partial rotation to the said rock-shaft and actuating the bundle-discharger K in the manner hereinbefore described. Upon the upstroke of the crank-arm $M^3$, the link $L^2$, being slotted, will play freely upon the pin l', thus allowing the bundle-discharger K to fall back into its first position of its own accord, instead of being forced back by means of the actuating mechanism. As the disk $M^2$ in its rotation approaches its first position, the arm n of the pawl N will strike against the shoulder o of the stop-arm O, which has been returned to its position through the medium of the spring O'. This contact of the pawl of the stop-arm will throw the arm n' inward, and thus disconnect the disk $M^2$ from the shaft M, thereby arresting its motion.

Q represents a spring arranged to bear upon the forward-projecting portion of the crank-pin $m^2$, which is extended for this purpose, the said spring serving to prevent the rotation of the disk $M^2$ backward, so as to allow the arm n' to project, said spring serving, in fact, to hold the arm n firmly against the shoulder o of the stop-arm O when the parts are not in operation.

R represents the seat-bar, to the upper end of which the driver's seat is attached.

The operation of our machine will be readily understood from the preceding description.

That side of the machine upon which the gathering and cutting mechanism is arranged may be readily adjusted by means of the devices described, and the guide-supports and carrying-chains may be also vertically adjusted independently of the adjustment of the main frame. The gathering-fingers $E^2$ are likewise adjustable, so as to enable the operator to arrange the same in proper position with relation to the ground. As the machine advances the standing corn is gathered in and carried rearward by means of the chains C, and after being severed by the cutter B the stalks are laid upon the deck I butts foremost. The conveyers $G^2$ serve to carry the corn laterally along the said deck to the binding mechanism, the butter $G^3$ co-operating in the manner hereinbefore described. The stalks are then compressed and tied and finally discharged by means of the discharge-arms J upon the bundle-discharger K. Each bundle in passing to the bundle-discharger serves to trip the operating mechanism thereof, so that the said bundle-discharger is actuated and caused to move in the arc of a circle, carrying the bundle upward and throwing it over the main wheel, thereby delivering it at the side of the machine. During the upward motion of the bundle-discharger the discharge-arms J are also moving upward, and in order to prevent their becoming engaged with any projecting stalks of the bundle, and thereby hindering the action of the bundle-discharger, these discharge-arms are hinged to swing upward in the manner hereinbefore described, so that any stalks coming in contact with them from below will merely turn them upon their pivots out of the way.

By carrying the stalks butt foremost across the machine we are enabled to arrange the operating mechanism of the binder or the greater portion thereof in front of the said deck, thereby rendering the machine more compact, while at the same time the bundles are tied at a proper distance from the butts.

It is obvious that various modifications in the details of construction may be made without departing from the principle of our invention, and we therefore do not wish to be understood as limiting ourselves to the precise details hereinbefore described, and shown in the drawings.

Having thus described our invention, what we claim as new, and desire to secure by Letters Patent, is—

1. In a corn-harvester, the combination, with the cutter, of laterally-moving conveyers arranged in the rear of the same, gathering and carrying chains arranged on each side of the cutter in advance of the same and extending diagonally upward and rearward and then horizontally rearward to a point slightly in the rear of the cutter, whereby the stalks are laid upon the conveyers with their butts toward the front of the machine, and a binding mechanism arranged to receive the stalks from the conveyers and bundle and bind the same, substantially as and for the purposes specified.

2. In a corn-harvester, the combination, with the main frame and the cutter mounted thereon, of the carrying-chains and their guide-supports, the gathering-arms connected to the guide-supports, and the uprights $D^2$ secured to the guide-supports and adjustably connected to the main frame by eyebolts $d^2$, substantially as and for the purposes specified.

3. In a corn-harvester, the combination, with the gathering-arms E, of the gathering-fingers $E^2$, pivoted to the lower ends of said arms, and the adjusting-bolts e, each pivoted near the front end of the gathering-fingers, extending rearward through a suitable lug, e', on the end of the gathering-arm E, and provided with adjusting-nuts $e^3$ on each side of said lug, substantially as and for the purposes specified.

4. In a corn-harvester, the carrying-chains C, arranged on each side of the cutter in advance of the same and extending diagonally upward and rearward and then horizontally rearward to a point slightly in the rear of the cutter, substantially as and for the purposes specified.

5. In a corn-harvester, the combination, with the cutter B, the deck I, the reciprocating conveyers $G^2$, and the binding mechanism, of the transverse vertical shield $G^5$, arranged in front of the conveyers and extending from the cutter to the binding mechanism, and the endless-belt butter $G^3$, arranged in a suitable aperture in said shield, substantially as and for the purposes specified.

6. In a corn-harvester, a bundle-discharger pivoted on an axis arranged longitudinally of the machine outside of and below the top of the main wheel, the said bundle-discharger swinging vertically in the arc of a circle over the main wheel to discharge the bundle from the machine, substantially as and for the purposes specified.

7. In a corn-harvester, the combination, with a suitable binding mechanism, of a bundle-discharger arranged to receive the bundle as it comes from the binder, actuating mechanism to cause said bundle-discharger to swing vertically in the arc of a circle to discharge the bundle, and a trip-arm arranged in the path of the bundle and actuated by the same to start the actuating mechanism of the bundle-discharger, substantially as and for the purposes specified.

8. In a corn-harvester, the combination, with the bundle-discharger swinging vertically in the arc of a circle and actuated positively during its outward throw, but free to return quickly to its original position by gravity, of spring-buffers arranged to receive the shock of the bundle-discharger as it falls back to its normal position, substantially as and for the purposes specified.

9. In a corn-harvester, the bundle-discharger K, consisting of a bar, K', provided with spring-arms $k'$, an arm, $k$, to which said bar is attached, and suitable operating mechanism, substantially as and for the purposes specified.

10. In a corn-harvester, the combination, with the cutter, of lateral conveyers arranged in the rear of the same, carrying-chains to gather the stalks and carry them to the cutter and deliver them with their butts to the front of the machine upon the lateral conveyers, a twine binding mechanism to receive the stalks from the conveyers and bundle and bind the same, and the bundle-discharger arranged at the side of the binding mechanism swinging on a longitudinal axis arranged outside of and below the top of the main wheel to receive the bundle from the binding mechanism and discharge the same from the machine at the side over the main wheel, substantially as and for the purposes specified.

11. In a corn-harvester, the combination, with the bundle-discharger K, of the rock-shaft L, carrying the same and provided with arm $l$, the link $L^2$ to said arm, the disk $M^2$, mounted loosely on the continuously-rotating shaft M and provided with a crank-arm connected to said link, and a clutch mechanism controlled by a suitable trip to automatically connect and disconnect said disk, and the shaft to operate the bundle-discharger, substantially as and for the purposes specified.

12. In a corn-harvester, the combination, with the shaft M, having collar M' with pins $m'$, of the disk $M^2$, provided with a crank-arm connected by a suitable link to the rock-shaft of the bundle-discharger, the spring-pawl N, having arms $n$ and $n'$, the stop-arm O, and the trip P, connected to said stop-arm, substantially as and for the purposes specified.

13. In a corn-harvester, the combination, with the rock-shaft L, carrying the bundle-discharger K and having arm $l$ with pin $l'$, of the disk $M^2$, having crank-arm $M^3$, and the link $L^2$, connected to said crank-arm and slotted longitudinally to receive the pin $l'$, substantially as and for the purposes specified.

14. In a corn-harvester, the combination, with the bundle-discharger K and its rock-shaft L, having arm $l$, of the disk $M^2$, having crank-arm $M^3$, and the link $L^2$, connected to the arm $l$ and provided with the adjustable extension $L^3$, pivoted to the crank-arm, substantially as and for the purposes specified.

GILBERT B. SNOW.
JAMES T. SNOW.

Witnesses:
PRATT BENJAMIN,
EVAN OWENS.